United States Patent
Bespalov et al.

(10) Patent No.: US 7,027,922 B2
(45) Date of Patent: Apr. 11, 2006

(54) DEEP RESISTIVITY TRANSIENT METHOD FOR MWD APPLICATIONS USING ASYMPTOTIC FILTERING

(75) Inventors: Alexander Bespalov, Spring, TX (US); Michael Rabinovich, Houston, TX (US); Leonty A. Tabarovsky, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 191 days.

(21) Appl. No.: 10/647,483

(22) Filed: Aug. 25, 2003

(65) Prior Publication Data

US 2005/0049791 A1    Mar. 3, 2005

(51) Int. Cl.
*G01V 1/40* (2006.01)
(52) U.S. Cl. .................. 702/7; 702/14; 703/5
(58) Field of Classification Search ............. 702/1–16; 324/303, 343, 373, 339, 800; 175/24, 45; 703/5, 10
See application file for complete search history.

(56) References Cited

U.S. PATENT DOCUMENTS

| | | | | |
|---|---|---|---|---|
| 3,124,742 | A * | 3/1964 | Schneider ................. | 324/373 |
| 3,340,464 | A * | 9/1967 | Gouilloud ................. | 324/339 |
| 5,452,761 | A | 9/1995 | Beard et al. .............. | 166/250 |
| 5,530,359 | A | 6/1996 | Habashy et al. .......... | 324/338 |
| 5,666,057 | A * | 9/1997 | Beard et al. .............. | 324/339 |
| 5,703,773 | A * | 12/1997 | Tabarovsky et al. ........ | 702/7 |
| 5,842,149 | A * | 11/1998 | Harrell et al. ............. | 702/9 |
| 5,955,884 | A | 9/1999 | Payton et al. ............ | 324/339 |
| 6,147,496 | A * | 11/2000 | Strack et al. ............. | 324/343 |
| 6,188,222 | B1 | 2/2001 | Seydoux et al. .......... | 324/339 |
| 6,206,108 | B1 * | 3/2001 | MacDonald et al. ........ | 175/24 |
| 6,219,619 | B1 * | 4/2001 | Xiao et al. ............... | 702/7 |
| 6,233,524 | B1 * | 5/2001 | Harrell et al. ............. | 702/9 |
| 6,400,148 | B1 * | 6/2002 | Meyer et al. ............. | 324/303 |
| 6,466,872 | B1 * | 10/2002 | Kriegshauser et al. ...... | 702/7 |
| 6,553,314 | B1 * | 4/2003 | Kriegshauser et al. ...... | 702/7 |
| 6,636,045 | B1 * | 10/2003 | Tabarovsky et al. ........ | 324/343 |

(Continued)

OTHER PUBLICATIONS

Glenn G. Wattley; *Achieving the Benefits of Improved Extracted Coal Quality to Mine Profitability and Power Generation Economics*, 2002 Society for Mining, Metallurgy, and Exploration, Inc. (SME) Annual Meeting & Exhibit, Feb. 25, 2002; pp. 1-8.

Alexander A. Kaufman; *Harmonic and transient fields on the surface of a two-layer medium*, Geophysics, vol. 44, No. 7 (Jul. 1979); pp. 1208-1217, 6 Figs.

(Continued)

*Primary Examiner*—Michael Nghiem
*Assistant Examiner*—Victor J. Taylor
(74) *Attorney, Agent, or Firm*—Madan, Mossman & Sriram, P.C.

(57) ABSTRACT

A method is discussed of obtaining a parameter of interest of an earth formation, typically a formation resistivity or a distance to a bed boundary, in conditions where an induction tool is using having a body with finite, non-zero conductivity. The method substantially removes the effects of the conductivity of the tool from the signal received from the earth formation. A Taylor series expansion in one half of odd integer powers of time is used to represent the received signal. At least one leading term of the Taylor series expansion can be subtracted from the second signal. A filtering operation is applied to the second signal to remove the terms most dominated by pipe effects. Typical filtering operations can be a differential filtering operation or an integral filtering operation.

29 Claims, 10 Drawing Sheets

U.S. PATENT DOCUMENTS

| | | | |
|---|---|---|---|
| 6,643,589 B1* | 11/2003 | Zhang et al. | 702/7 |
| 6,727,696 B1* | 4/2004 | Kruspe et al. | 324/303 |
| 6,906,521 B1 | 6/2005 | Tabarovsky | 324/334 |
| 2002/0173913 A1* | 11/2002 | Tabarovsky et al. | 702/7 |
| 2005/0030059 A1* | 2/2005 | Tabarovsky et al. | 324/800 |

OTHER PUBLICATIONS

Alexander A. Kaufman; *The influence of currents induced in the host rock on electromagnetic response of a spheroid directly beneath a loop,* Geophysics, vol. 46, No. 8 (Aug. 1981), pp. 1121-1136, 22 Figs., 2 Tables.

* cited by examiner

DEEP RESISTIVITY TRANSIENT METHOD FOR MWD APPLICATIONS USING ASYMPTOTIC FILTERING

BACKGROUND OF THE INVENTION

1. Field of the Invention

The invention is related to the field of electromagnetic induction well logging for determining the resistivity of earth formations penetrated by a wellbore. More specifically, the invention relates to measuring the transient signals in an induction tool having a metallic pipe with finite, non-zero and high conductivity.

2. Description of the Related Art

Electromagnetic induction resistivity instruments can be used to determine the electrical conductivity of earth formations surrounding a wellbore. An electromagnetic induction well logging instrument is described, for example, in U.S. Pat. No. 5,452,761 issued to Beard et al. The instrument described in the Beard '761 patent includes a transmitter coil and a plurality of receiver coils positioned at axially spaced apart locations along the instrument housing. An alternating current is passed through the transmitter coil. Voltages which are induced in the receiver coils as a result of alternating magnetic fields induced in the earth formations are then measured. The magnitude of certain phase components of the induced receiver voltages are related to the conductivity of the media surrounding the instrument.

The development of deep-looking electromagnetic tools has a long history. Such tools are used to achieve a variety of different objectives. Deep looking tools attempt to measure the reservoir properties between wells at distances ranging from tens to hundreds of meters (ultra-deep scale). There are single-well and cross-well approaches, most of which are rooted in the technologies of radar/seismic wave propagation physics. This group of tools is naturally limited by, among other things, their applicability to only high resistivity formations and the power available down-hole.

At the ultra-deep scale, a technology may be employed based on transient field behavior. The transient electromagnetic field method is widely used in surface geophysics. Examples of transient technology are seen, for example, in Kaufman (1979) and Kaufman (1989). Sidorov et al., 1969, "Geophysical surveys with near zone transient EM." Published by NVIGG, Saratov, Russia (in Russian); and Rabinovich et al., 1981, "Formation of an immersed vertical magnetic dipole field": *j. Geologiya I Geofizika*, N 3.(in Russian). Typically, voltage or current pulses that are excited in a transmitter initiate the propagation of an electromagnetic signal in the earth formation. Electric currents diffuse outwards from the transmitter into the surrounding formation. At different times, information arrives at the measurement sensor from different investigation depths. Particularly, at a sufficiently late time, the transient electromagnetic field is sensitive only to remote formation zones and does not depend on the resistivity distribution in the vicinity of the transmitter (see Kaufman et al., 1983). This transient field is especially important for logging. A comprehensive study of deep-reading transient EM in wireline measurements has been conducted and discussed by Geldmacher et al., 1997 ("Single well (deep-reading) EM system." Report on the pre-feasibility study, Western Atlas, Inc.). Use of a symmetric logging tool using transient field measurements for formation detection is discussed in U.S. Pat. No. 5,530,359, issued to Habasby et al.

U.S. Pat. No. 5,955,884, issued to Payton et al. discusses methods for measuring transient electromagnetic fields in rock formations. Electromagnetic energy is applied to the formation at selected frequencies and waveforms that maximize the radial depth of penetration of the magnetic and electric energy. Payton '884 comprises at least one electromagnetic transmitter and at least one electric transmitter for applying electric energy. The transmitter ands may be either single-axis or multi-axis electromagnetic and/or electric transmitter. In one embodiment the TEM transmitters and TEM receivers are separate modules that are spaced apart and interconnected by lengths of cable, with the TEM transmitter and TEM receiver modules being separated by an interval of one meter up to 200 meters as selected. Radial depth of investigation is related to the skin depth $\delta = \sqrt{2/\sigma\mu\omega}$ which in turn is related to frequency. Lower frequency signals can increase the skin depth. Similarly, the conductivity of the surrounding material inversely affects the skin depth. As conductivity increases the depth of investigation decreases. Finite conductivity casing of the apparatus therefore can reduce the depth of investigation.

Rapidly emerging measurement-while-drilling (MWD) technology introduces a new, meso-deep (3–10 meters) scale for an electromagnetic logging application related to well navigation in thick reservoirs. The major problem associated with the MWD environment is the introduction of a metal drill pipe close to the area being measured. This pipe produces a very strong response and significantly reduces the sensitivity of the measured EM field to the effects of formation resistivities and remote boundaries. The only previous solution for this problem has been to create a large spacing (up to 20 meters) between transmitter and receiver (as discussed in U.S. Pat. No. 6,188,222 B1, issued to Seydoux et al.). The sensitivity of such a tool to remote boundaries is low. Currently, Stolar Horizon, Inc. is developing drill string radar, DSR, for CBM (Coal Bed Methane) wells. DSR provides 3-D imaging within a close range of the wellbore.

There is a need for a method of processing data acquired with real MWD tools having finite non-zero conductivity in transient field studies. The present invention satisfies this need.

SUMMARY OF THE INVENTION

The present invention is a method of obtaining a parameter of interest of an earth formation using a tool having a body with finite, non-zero conductivity. The parameter of interest is typically a resistivity of the formation or a distance to a bed boundary in the formation. The method obtains a signal from the earth formation that is substantially independent of the conductivity of the tool. A first signal is produced using a transmitter on the tool. An axially separated receiver receives a second signal that results from an interaction of the first signal with the earth formation. The second signal is dependent on the conductivity of the induction tool. This second signal can be represented using a. Taylor series expansion in one half of odd integer powers of time. The $t^{-1/2}$ and $t^{-3/2}$ terms are typically due to the finite-conductivity pipe. The $t^{-5/2}$ term is dominated by the effects of the formation. At least one leading term of the Taylor series expansion can be subtracted from the second signal to reduce the effect of the metal pipe.

A filtering operation is applied to the second signal. In one mode of the invention, a differential filtering operation is employed. A typical differential filter further comprises taking a time-derivative of the product of the second signal with $t^{1/2}$. Such filter eliminates the main term of the pipe contribution to the signal. In an alternate mode of the invention, an integral filtering operation is employed. Such an integral filtering operation can further comprise defining a first and second specified time, $t_1$ and $t_2$. An average of the measured field with a weight of $t^{1/2}$ can be made over two time intervals center on the first and second specified times, both intervals having a duration $\Delta$. A difference produces an integration filter:

$$I_1 - I_2 \approx \frac{1}{\Delta} \int_{-\Delta/2}^{\Delta/2} t^{1/2} [H_z^0(t-t_1) - H_z^0(t-t_2)] dt$$

where $H_z$ represents the second signal. Such a filter eliminates most of the influence of the pipe.

DESCRIPTION OF PREFERRED EMBODIMENT

Figure 1:
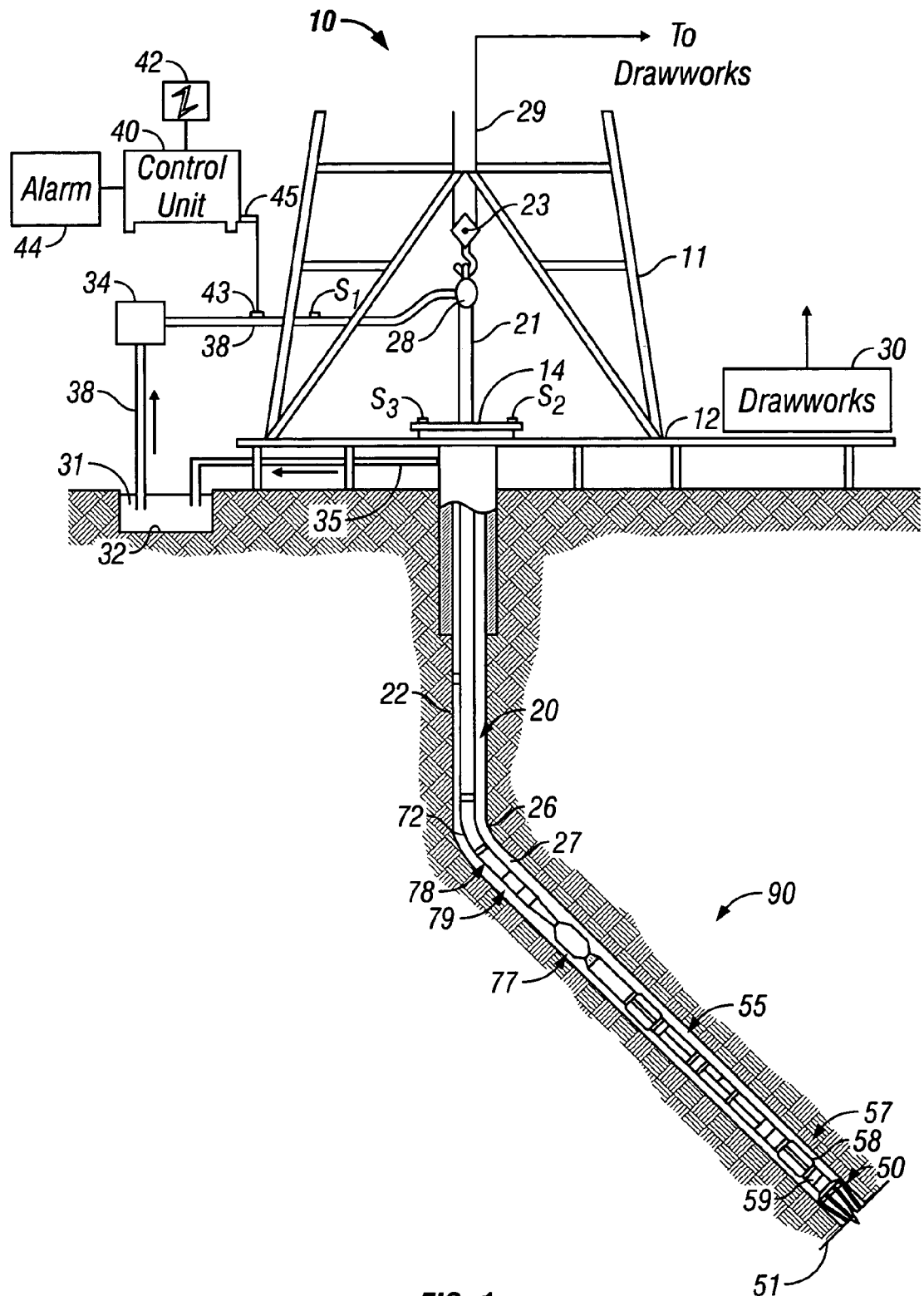
FIG. 1 (Prior Art) shows an induction logging instrument as it is typically used to make measurements suitable for use with the method of the invention.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the preferred embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20.

Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$–$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur.

Figure 2A:
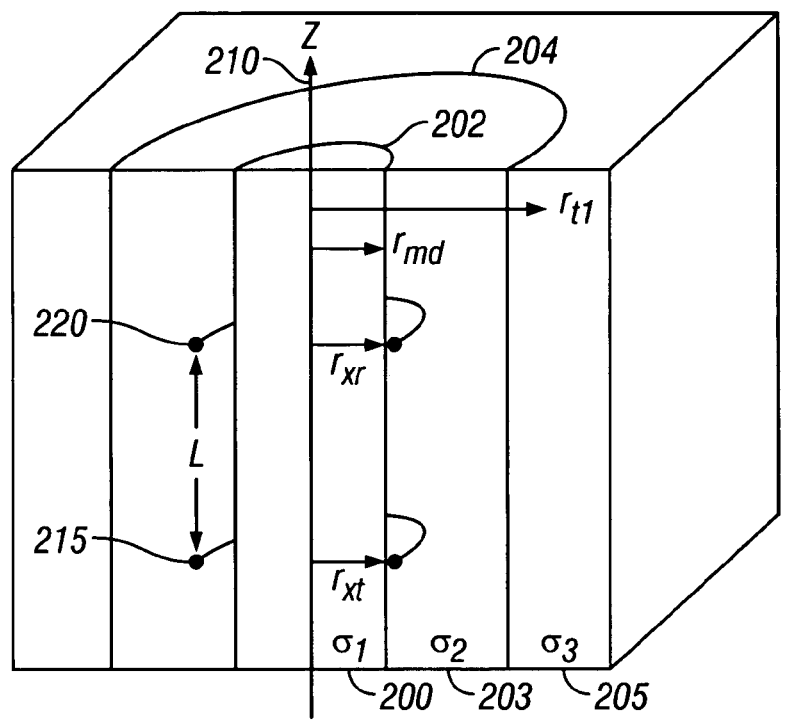
FIG. 2A shows a typical cylindrical wellbore configuration for oil exploration.

FIG. 2A shows a typical cylindrical structure, comprising three zones substantially defined by a metal pipe 200, adjacent transition layers 203, and remote infinite formation 205. Conductivities of the three zones are $\sigma_1$, $\sigma_2$, and $\sigma_3$, respectively. The magnetic permeability of the entire space is $\mu$. As illustrated, the cylindrical boundary 202 separating the metal pipe from the transition layer and the cylindrical boundary 204 separating the regions of transition layer and remote formation share a common z-axis 210. As measured from the z-axis, the radius of boundary 202 is labeled as $r_{md}$, and the radius of boundary 204 is labeled as $r_{tl}$. An electromagnetic field is excited by a transmitter current loop 215 of radius, $r_{xt}$, and is measured by a receiver loop 220 of radius $r_{xr}$. Transmitter loop and receiver loop are separated by distance L. The amplitude and frequency of the AC transmitter current are I and $\omega$, respectively.

There is only one component $E_\varphi$ of the electric field in the considered model of FIG. 2A, and it satisfies the Maxwell's equation detailed in Eq. (1) under the conditions of Eq. (2):

$$\frac{1}{r}\frac{\partial}{\partial r}\left(r\frac{\partial E_\varphi}{\partial r}\right) - \frac{E_\varphi}{r^2} + \frac{\partial^2 E_\varphi}{\partial z^2} = k^2 E_\varphi \tag{1}$$

where $$k_j^2 = -i\omega\mu\sigma_j, \; j=1, 2, 3 \tag{2}$$

As is well known in the art, boundary conditions require a continuity of the tangential electric field $E_\varphi$, and of the tangential magnetic field, $H_z$, at boundaries 202 and 204. These conditions may be expressed mathematically in the form:

$$\left.\begin{array}{l}[E_\varphi]=0 \\ \left[\dfrac{\partial E_\varphi}{\partial r}\right]=0\end{array}\right\} \text{ at } r=r_{mn}, r_{tl} \tag{3}$$

An analytical solution for the boundary value problem of Eqs. (1) and (3), may be found using known techniques of the Fourier transform and separation of variables. The resulting expressions for an electromotive force induced in the receiver, $E_f = 2\pi r_{xt} E_\varphi$, are shown below:

$$E_f = \int_0^\infty (F_a + F_b)\cos(\lambda L)\,d\lambda + \frac{i\omega\mu(2\pi r_{xt})(2\pi r_{xr})}{2\pi}\int_0^\infty \frac{\lambda}{2p_2}e^{-p_2 L}J_1(\lambda r_{xt})J_1(\lambda r_{xr})\,d\lambda \tag{4}$$

$$F_a = \frac{i\omega\mu(2\pi r_{xt})(2\pi r_{xr})}{2\pi^2 \text{Det}}\left[\begin{array}{c}\dfrac{I_1(p_2*r_{md})}{K_1(p_2*r_{md})}\dfrac{K_1(p_2*r_{tl})}{I_1(p_2*r_{tl})}K_1(p_2*r_{xt})I_1(p_2*r_{xr})\dfrac{\alpha_{11}\alpha_{22}}{\alpha_{12}\alpha_{21}} \\ -\dfrac{K_1(p_2*r_{tl})}{I_1(p_2*r_{tl})}I_1(p_2*r_{xt})I_1(p_2*r_{xr})\dfrac{\alpha_{22}}{\alpha_{21}}\end{array}\right] \tag{5}$$

$$F_b = \frac{i\omega\mu(2\pi r_{xt})(2\pi r_{xr})}{2\pi^2 \text{Det}}\left[\begin{array}{c}\dfrac{I_1(p_2*r_{md})}{K_1(p_2*r_{md})}\dfrac{K_1(p_2*r_{tl})}{I_1(p_2*r_{tl})}I_1(p_2*r_{xt})K_1(p_2*r_{xr})\dfrac{\alpha_{11}\alpha_{22}}{\alpha_{12}\alpha_{21}} \\ -\dfrac{I_1(p_2*r_{md})}{K_1(p_2*r_{md})}K_1(p_2*r_{xt})K_1(p_2*r_{xr})\dfrac{\alpha_{11}}{\alpha_{12}}\end{array}\right] \tag{6}$$

$$p_j^2 = k_j^2 + \lambda_j^2 \tag{7}$$

$$\alpha_{11} = 1 - \frac{p_2}{p_1}\frac{I_1(p_1*r_{md})I_0(p_2*r_{md})}{I_0(p_1*r_{md})I_1(p_2*r_{md})} \tag{8}$$

$$\alpha_{12} = 1 + \frac{p_2}{p_1}\frac{I_1(p_1*r_{md})K_0(p_2*r_{md})}{I_0(p_1*r_{md})K_1(p_2*r_{md})} \tag{9}$$

$$\alpha_{21} = 1 + \frac{p_2}{p_3}\frac{K_1(p_3*r_{tl})I_0(p_2*r_{tl})}{K_0(p_3*r_{tl})I_1(p_2*r_{tl})} \tag{10}$$

$$\alpha_{22} = 1 - \frac{p_2}{p_3}\frac{K_1(p_3*r_{tl})K_0(p_2*r_{tl})}{K_0(p_3*r_{tl})K_1(p_2*r_{tl})} \tag{11}$$

$$\text{Det} = 1 - \frac{I_1(p_2*r_{md})K_1(p_2*r_{tl})}{K_1(p_2*r_{md})I_1(p_2*r_{tl})}\frac{\alpha_{11}\alpha_{22}}{\alpha_{12}\alpha_{21}} \tag{12}$$

The second term of Eq. (4) describes the field generated by a transmitter in an infinite uniform space with conductivity, $\sigma_2$. The term $F_a$ in Eq. (4) describes the field reflected from the boundary 204. The coefficient, $F_b$, describes the field reflected from the inner boundary 202.

Figure 3:
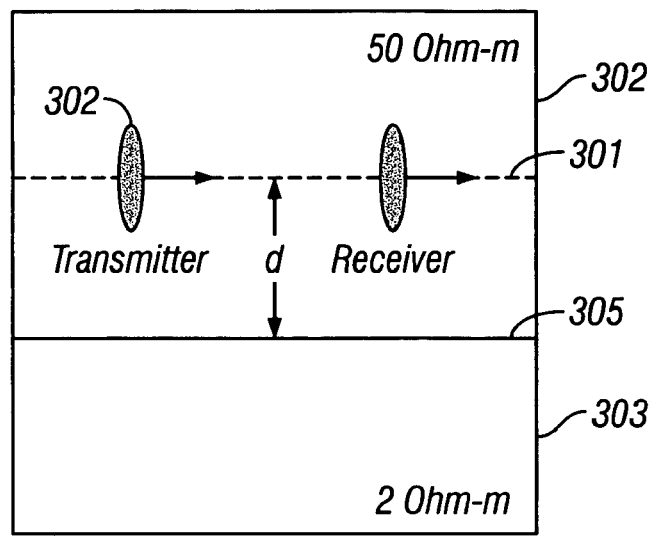
FIG. 3 shows a transmitter-receiver assembly positioned near a formation boundary.
Figure 4:
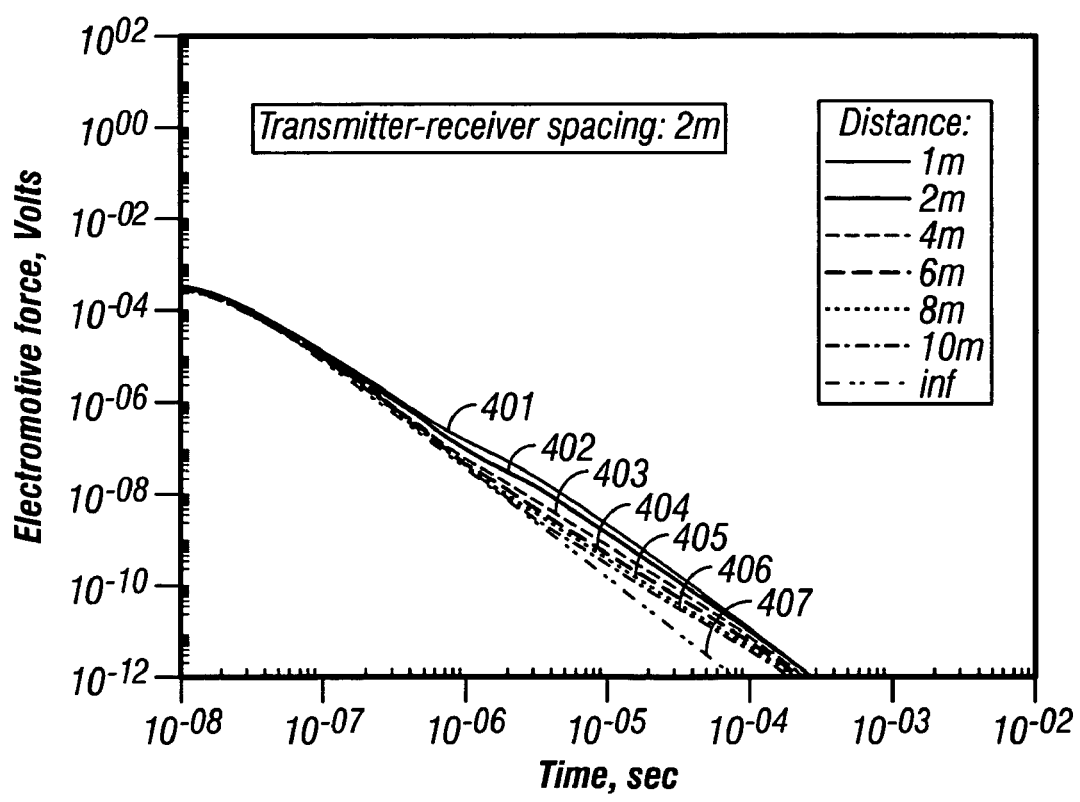
FIG. 4 shows transient responses due to a remote plane boundary of the configuration of FIG. 3.

FIG. 3 shows a transmitter-receiver assembly lying next to a formation boundary 305. Transmitter and receiver lie along a common axis 301 that is horizontally positioned in the upper half-space 302 parallel to the formation boundary and is separated by a distance d from said boundary. The upper half-space 302 has a resistivity of 50 Ohm-m and the remote formation (lower half-space) 303 has a resistivity of 2 Ohm-m. FIG. 4 shows transient responses of the transmitter-receiver assembly operated in the presence of a remote plane boundary without the presence of a metal pipe. Responses are measured in Volts along the vertical axis and the time is shown in seconds along the horizontal axis. The transmitter-receiver space is 2 m and transient responses are shown for several distances. Responses at distances of 1, 2, 4, 6, 8, and 10 meters are shown as 401, 402, 403, 404, 405, and 406, respectively. The response for infinite separation distance is shown as 407. Due to the skin-effect, at a very early times (t<100 nanoseconds) there is no sensitivity to remote boundaries. In the time interval 100 nsec<t<100 μsec, the responses depend significantly on the distance to the boundary 305. It is during this time interval that the time when the currents diffuse deeper into formation and reach this boundary. Later, t>100 μsec, the responses once again show a lack of dependence on the distance to the boundary, because the diffusing currents have passed the boundary and are flowing predominantly in the conductive lower half-space 303.

Figure 5:
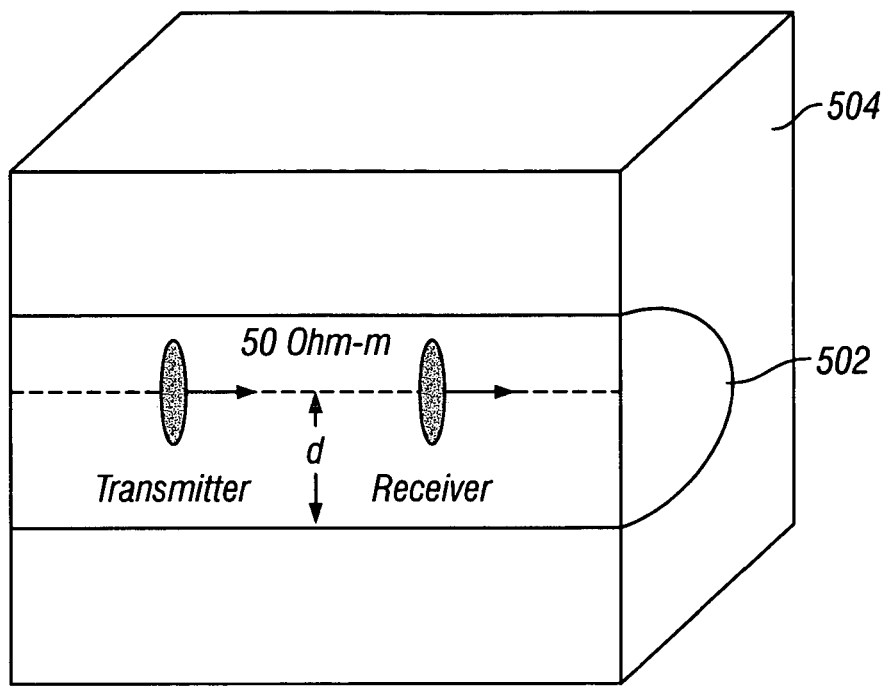
FIG. 5 shows a cylindrical model of the borehole configuration.
Figure 6:
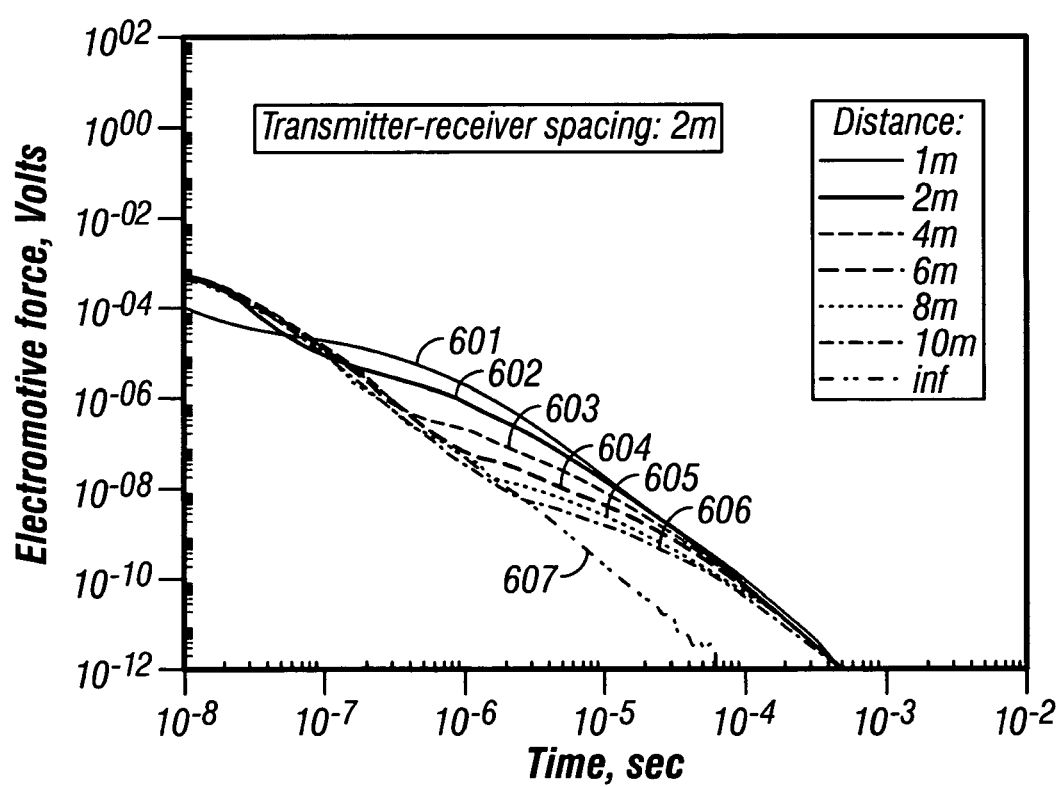
FIG. 6 shows transient responses due to the remote cylindrical boundary in the configuration of FIG. 5.

FIG. 5 introduces a cylindrical pipe into the model of FIG. 3. Introducing a cylindrical pipe into the considered formation introduces 3D effects. However, as in FIG. 5, one can consider a 1D cylindrically layer model where the inner layer 502 represents the 50 Ohm-m inner layer 302 (of FIG. 3) and the outer formation 504 has a resistivity of 2 Ohm-m. A more intense influence of the outer cylinder compared to the outer space in a plane model of FIG. 3 is expected. Nevertheless, any approach developed for a cancellation of the pipe effect in a cylindrically layered formation will remain valid in the model with a plane boundary. FIG. 6 shows the transient response in the presence of a remote cylindrical boundary without a metal pipe. The responses at a distance of 1, 2, 4, 6, 8, and 10 meters are shown as 601, 602, 603, 604, 605, and 606, respectively. The response for an infinite separation distance is shown as 607. Comparison of the responses in FIG. 6 to those is FIG. 4 indicate that the resolution in a cylindrical geometry is larger than the resolution obtained from a plane model. Such resolution is, however, sufficient for boundary detection. A greater separation can be found between curves 601 through 606 than are found between curves 401 through 407. The separation of response curves is most pronounced at earlier times in FIG. 6.

The ability of the method of the present invention to obtaining a temporal signal substantially independent of conductivity enables for a reduced distance between transmitter and receiver. Typical prior art methods requires transmitter-receiver spacing in a range of 20–30 m in order to obtain a measurement at a radial depth of about 10 m. In the method of present invention, the same depth can be achieved with a spacing of 1–2 m. The sensitivity to remote formation volumes is substantially independent of transmitter-receiver spacing.

Figure 2B:
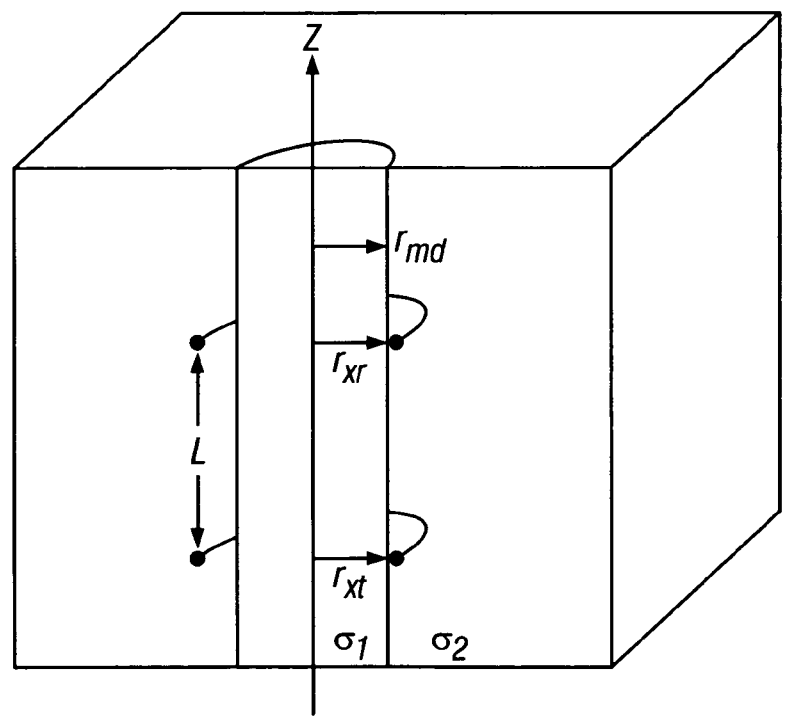
FIG. 2B shows the wellbore from FIG. 2A introducing a perfectly conductive pipe.

It is possible to use the general model of FIG. 2A to obtain equations under more specific conditions. For example, FIG. 2B shows the model from FIG. 2A under the condition of a perfectly conductive pipe $\sigma_1=\infty$ and with $\sigma_2=\sigma_3$. When $\sigma_2=\sigma_3$, it follows from Eq. (11) that the coefficient $\alpha_{22}$, vanishes and, consequently $F_\alpha=0$ (see Eq. 5). The generalized equations above are subsequently simplified to Eqs. (13) and (14) shown below:

$$E_f = \int_0^\infty (F_b)\cos(\lambda L)d\lambda + \frac{i\omega\mu(2\pi r_{xt})(2\pi r_{xr})}{2\pi}\int_0^\infty \frac{\lambda}{2p_2}e^{-p_2 L}J_1(\lambda r_{xt})J_1(\lambda r_{xr})d\lambda \quad (13)$$

where $$F_b = \frac{i\omega\mu(2\pi r_{xt})(2\pi r_{xr})}{2\pi^2}\left[\frac{I_1(p_2 * r_{md})}{K_1(p_2 * r_{md})}K_1(p_2 * r_{xt})I_1(p_2 * r_{xr})\right] \quad (14)$$

Figure 7:
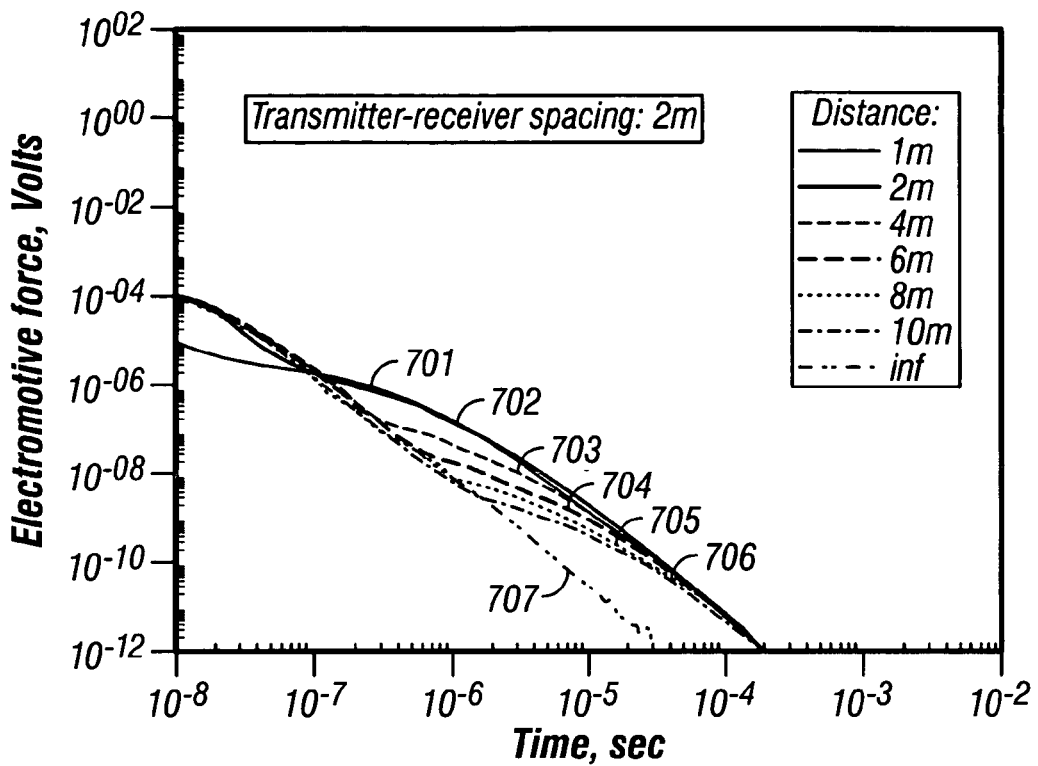
FIG. 7 shows transient responses in the presence of a remote boundary and a perfectly conductive metal pipe.

These equations describe the frequency dependence of the measured field for all frequencies of the transmitter current (for I=1 Ampere). The second term of the Eq. (13) describes the electromotive force in a uniform space with conductivity, $\sigma_2$ (primary field). The first term represents the effect of the pipe (secondary field). The transient response of this perfectly conducting pipe with a remote boundary is shown in FIG. 7. The time duration is measured on the horizontal axis from $10^{-8}$ seconds to $10^{-2}$ seconds. The response is measured in Volts. Response curves obtained distances d=1, 2, 4, 6, 8, and 10 meters are shown as 701, 702, 703, 704, 705, and 706. The response obtained at an infinite separation distance is shown as 707. The separation of the curves indicates that the measured field retains a high sensitivity to remote boundaries even in the presence of a perfectly conductive pipe. Comparison of FIGS. 6 and 7 shows that they are substantially identical.

An expansion of the local fields can be made in the frequency domain. The electric field, E, may be expanded in the following Taylor series with respect to ½ powers of the frequency $\omega$.

$$E = \sum_{k=2}^{k=\infty} u_{k/2}(-i\omega)^{k/2} \quad (15)$$

$$u_{3/2} = 0$$

The coefficient $u_{5/2}$ corresponding to the term $\omega^{5/2}$ is independent of the properties of a near borehole zone, thus $u_{5/2}=u_{5/2}^0$. Rather this term is sensitive only to the conductivity distribution in the undisturbed formation.

The magnetic field can similarly be expanded in a Taylor series (16):

$$H = \sum_{k=0}^{k=\infty} s_{k/2}(-i\omega)^{k/2} \quad (16)$$

$$s_{1/2} = 0$$

The coefficient $s_{3/2}$ of the term corresponding to $\omega^{3/2}$ can be shown to depend only on the properties of the background formation, in other words $s_{3/2}=s_{3/2}^0$.

Referring to Eq. (A3.9) of the Appendix, in the frequency domain, Eq. (17), below, accounts for the finite conductivity of the pipe if the shape of the applied current is assumed to be the Dirac function, $\delta(t)$:

$$H(\omega) = \tag{17}$$
$$H^0(\omega) + \frac{1}{\sqrt{\sigma_c}} \left( \frac{b_0}{(-i\omega\mu)^{1/2}} + (-i\omega\mu)^{1/2} b_1 + (-i\omega\mu) b_{3/2} + (-i\omega\mu)^{3/2} b_2 + \ldots \right)$$

where H is the measured magnetic field in the presence of a finite conductivity pipe; $H^0$ is the magnetic field that would be measured if the pipe were perfectly conductive; $\sigma_c$ is the conductivity of the pipe; $\omega = 2\pi f$, where f is the frequency; and $\mu$ is the magnetic permeability of the free space. This expansion can be transferred to the time domain to obtain an expression of the transient field response. Transformation of the Eq. (17) to the time domain using the Fourier transform yields:

$$H(t) = \tag{18}$$
$$H^0(t) + \frac{1}{\sqrt{\sigma_c}} \frac{1}{\sqrt{\pi}} \left( \frac{1}{(t\mu)^{1/2}} b_0 - \frac{\mu^{1/2}}{2t^{3/2}} b_1 + \frac{3\mu^{3/2}}{4t^{5/2}} b_2 + \ldots \right)$$

In the absence of a pipe, the measured electromotive force for step-function switch-on/switch-off modes, or the equivalent $H_z^0$ component of the magnetic field for the Dirac current shape, have the following expansion $$H_z^0 \approx \frac{(H_z^0)_{5/2}}{t^{5/2}} + \frac{(H_z^0)_{7/2}}{t^{7/2}} + \ldots \tag{19}$$

A comparison of Eq. (17) and Eq. (18) shows that the following correspondence exists between the frequency series and the time domain expansion of the field at late times (for step-function switch-on/switch-off modes):

$$t^{-n/2} \Rightarrow \omega^{n/2-1}, \; n=1, 3, 5, \ldots \tag{20}$$

The integer powers of the frequency expansions do not contribute to the late stage of the transient process.

Terms that are on the order of $\omega^{3/2}$ correspond to the terms that are on the order of $t^{-5/2}$ in the transient domain. Collecting these terms leads to Eq. (21) below:

$$\frac{(H_z)_{3/2}}{t^{5/2}} \approx \frac{(H_z^0)_{3/2}}{t^{5/2}} + \frac{1}{\sqrt{\sigma_c}} \frac{3\mu^{3/2}}{4\sqrt{\pi}} \frac{b_2}{t^{5/2}} \tag{21}$$

In order to obtain time domain results comparable with multi-frequency focusing (MFF), an elimination of the terms in $t^{-1/2}$ and $t^{-3/2}$ in Eq. (18) is practical.

The structure of the expansion (18) enables the following general trends in the behavior of the transient response when the conductivity of the pipe is finite but large:

As time increases, the signal due to the pipe dominates over the signal generated by the formation. The dominance occurs because the formation response decays much faster ($t^{-5/2}$) compared to the pipe response ($t^{-1/2}$). Increasing the pipe contribution to the measured field results in a reduced sensitivity to remote boundaries.

The higher the conductivity of the pipe, the less the effect of the pipe on the resolution, because the terms describing the pipe signal are inversely proportional to $\sigma^{1/2}$.

The present invention removes the effects of term $t^{-1/2}$ and $t^{-3/2}$. Typically, coefficient $b_0$ can be determined by examining the signal at a time late in the transient behavior (in the range of $10^{-4}$ to $10^{-2}$. As terms of $t^{-5/2}$ and higher decay at earlier times, data at all varying transmitter-receiver distances exhibit the same tail end behavior.

Figure 8A:
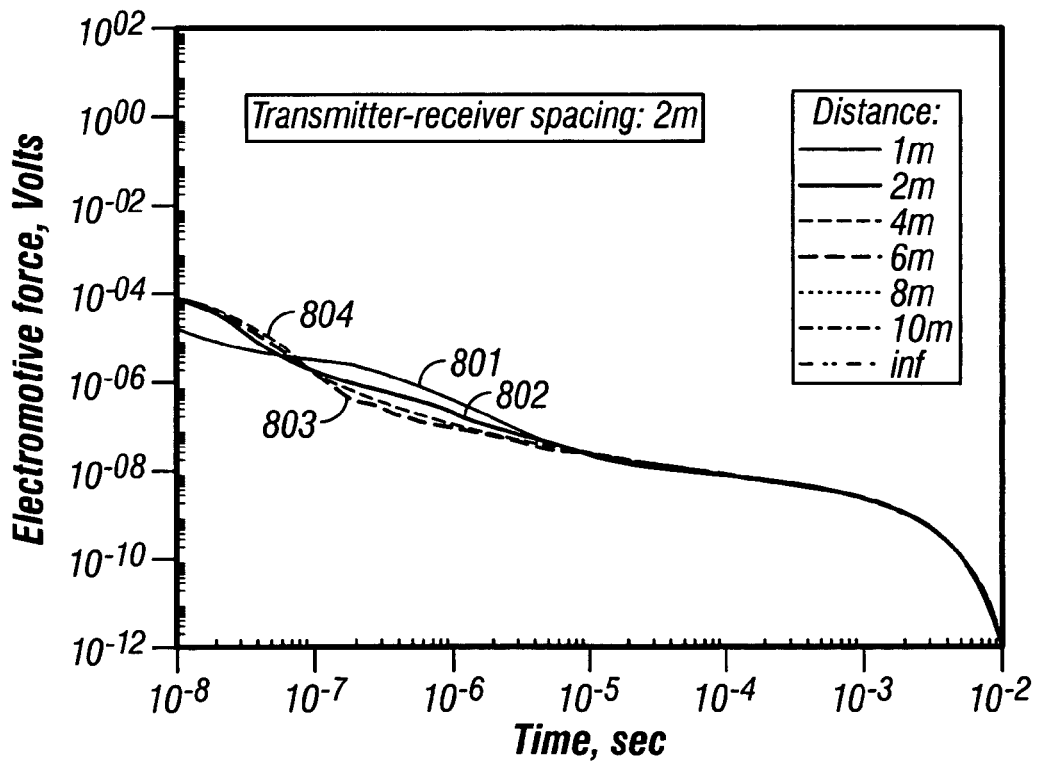
FIG. 8A, B show transient responses using pipes of differing conductivities.
Figure 8B:
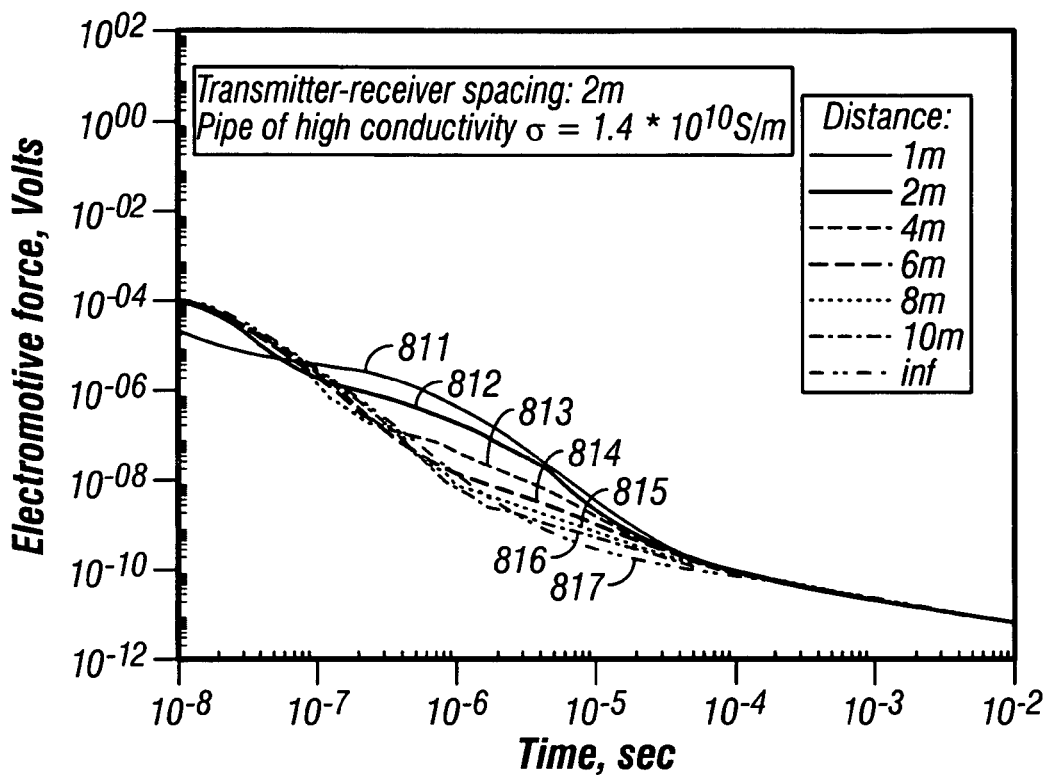

FIG. 8A shows the transient responses obtained in the presence of a typical conductive pipe. The conductivity is $\sigma = 1.4 \ast 10^6$ S/m. Curves 801, 802, and 803, indicate responses at distances of 1, 2, and 4 meters to a remote boundary. Response curve 804 represents the response to a remote boundary at an infinite distance. Response curve 804 is nearly indistinguishable from and overlaps response curves at a distance of 6 m, 8 m, and 10 m. Increasing the conductivity of the metal pipe improves the sensitivity of the tool to a remote boundary. FIG. 8B shows the transient responses for a tool with an increased conductivity of the pipe, $\sigma = 1.4 \ast 10^{10}$ S/m, taken at various distances to the remote boundary. The $\sigma$ of the pipe of FIG. 8B is 4 orders of magnitude higher than the typical conductivity of a metal pipe of FIG. 8A. The response curves of FIG. 8B reflects an improvement in sensitivity. Curves 811, 812, 813, 814, 815, and 816 represent the response to a remote boundary at a distance of 1, 2, 4, 6, 8, and 10 meters, respectively. Curve 817 represents the response to a remote boundary at an infinite distance. Comparing the curves of FIG. 8B to the curves of FIG. 8A, it is possible to observe a significant increase in the spread in the magnitude of the response curves 811 through 816 in FIG. 8B to that of the response curves 801 through 804 in FIG. 8A.

The present invention outlines several numerical methods for correcting measurements obtained in the presence of a pipe with finite conductivity. The asymptotic Eq. (18) indicates that, within certain time intervals, the electromotive transient magnetic field may be expanded in the following Taylor series expansion:

$$\begin{pmatrix} H_z(t_1) \\ H_z(t_2) \\ \vdots \\ H_z(t_{m-1}) \\ H_z(t_m) \end{pmatrix} = \begin{pmatrix} t_1^{-1/2} & t_1^{-3/2} & t_1^{-5/2} & \ldots & t_1^{n/2} \\ t_2^{-1/2} & t_2^{-3/2} & t_1^{-5/2} & \ldots & t_2^{n/2} \\ \vdots & \vdots & \vdots & \ldots & \vdots \\ t_{m-1}^{-1/2} & t_{m-1}^{-3/2} & t_{m-1}^{-5/2} & \ldots & t_{m-1}^{n/2} \\ t_m^{-1/2} & t_m^{-3/2} & t_m^{-3/2} & \ldots & t_m^{n/2} \end{pmatrix} \begin{pmatrix} s_{1/2} \\ s_{3/2} \\ s_{5/2} \\ \vdots \\ s_{(2n-1)/2} \end{pmatrix} \tag{22}$$

where to $t_1, \ldots, t_m$ is the measurement time, and $s_{1/2}, \ldots, s_{n/2}$ are the expansion coefficients.

A comparison of Eqs. (18), (19) and (22), reveals that coefficients, $S_{1/2}$ and $S_{3/2}$, are mostly dependent on the pipe conductivity. Only the third expansion coefficient $S_{5/2}$ is directly related to the formation conductivity (see Eq. 21):

$$S_{5/2} = (H_z^0)_{5/2} + \frac{1}{\sqrt{\sigma_c}} \frac{3\mu^{3/2}}{4\sqrt{\pi}} b_2 \tag{23}$$

Figure 9:
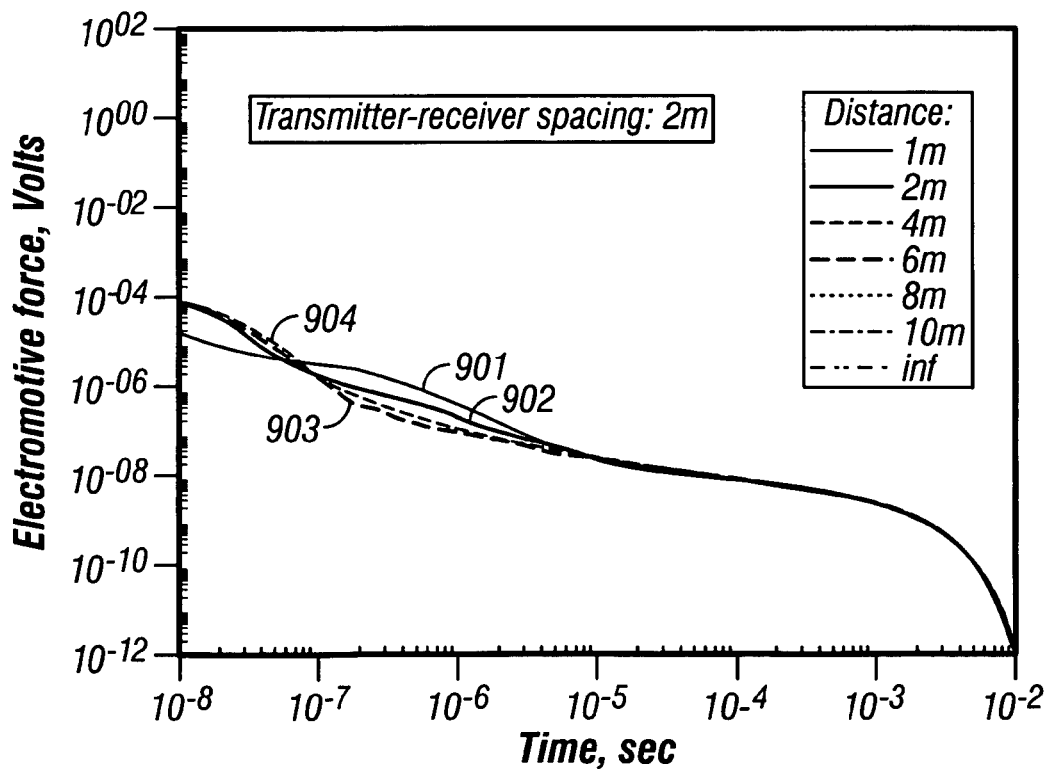
FIG. 9 shows an unfiltered transient responses of data obtained in the presence of a conductive pipe.
Figure 10:
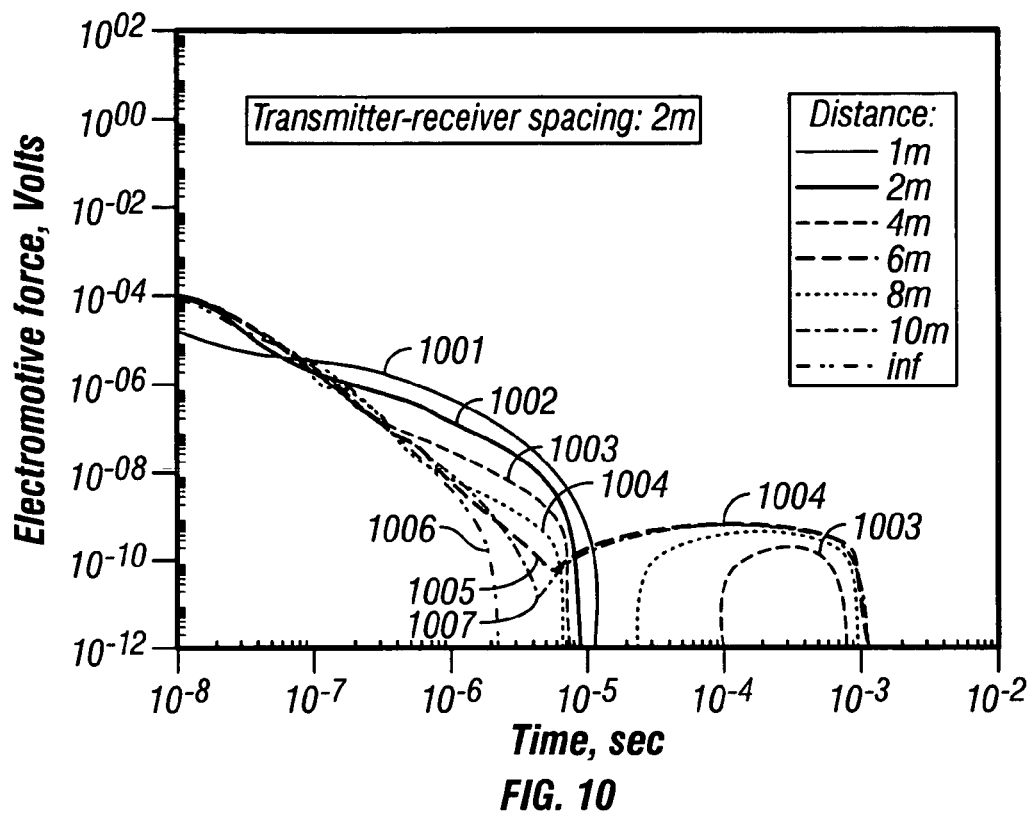
FIG. 10 shows the data are of FIG. 9 subjected to least squares processing.

Given a sufficient measurement time (m>n), one can find the least squares solution for the system of Eq. (22) and preferably subtract the terms corresponding to $S_{1/2}$ from the measured field to remove effects of pipe conductivity. Numerical modeling confirms that, for all practical purposes, it is satisfactory to cancel only the $S_{1/2}$ term. Alternatively, and depending on the pipe and formation conductivity, one can calculate both the effects of $S_{1/2}$ and $S_{3/2}$ in Eq. (22) and Eq. (24):

$$\tilde{H}(t) = H_z(t) - \frac{S_{1/2}}{t^{1/2}} - \frac{S_{3/2}}{t^{3/2}} \tag{24}$$

where $H_z$ is the measured response. FIG. 9 shows a transient behavior of data prior to processing. Reference numerals 901, 902, and 903, indicate responses at distances of 1, 2, and 4 meters to a remote boundary. Response curve 904 represents the response to a remote boundary at distances of 6 m, 8 m, 10 m, or an infinite distance. These response curves are nearly indistinguishable from each other. In FIG. 10, the data of FIG. 9 are subjected to the least square processing of Eq. (22). The resolution is thereby significantly improved. Separation can be seen between response curves 1001, 1002 and 1003 representing response to a remote boundary at 1, 2, and 4 meters. Furthermore response curves 1004, 1005, and 1006, representing responses to a remote boundary at 6, 8, and 10 meters, are distinguishable from each other and from curve 1007, which represents a boundary at infinite distance.

Figure 11:
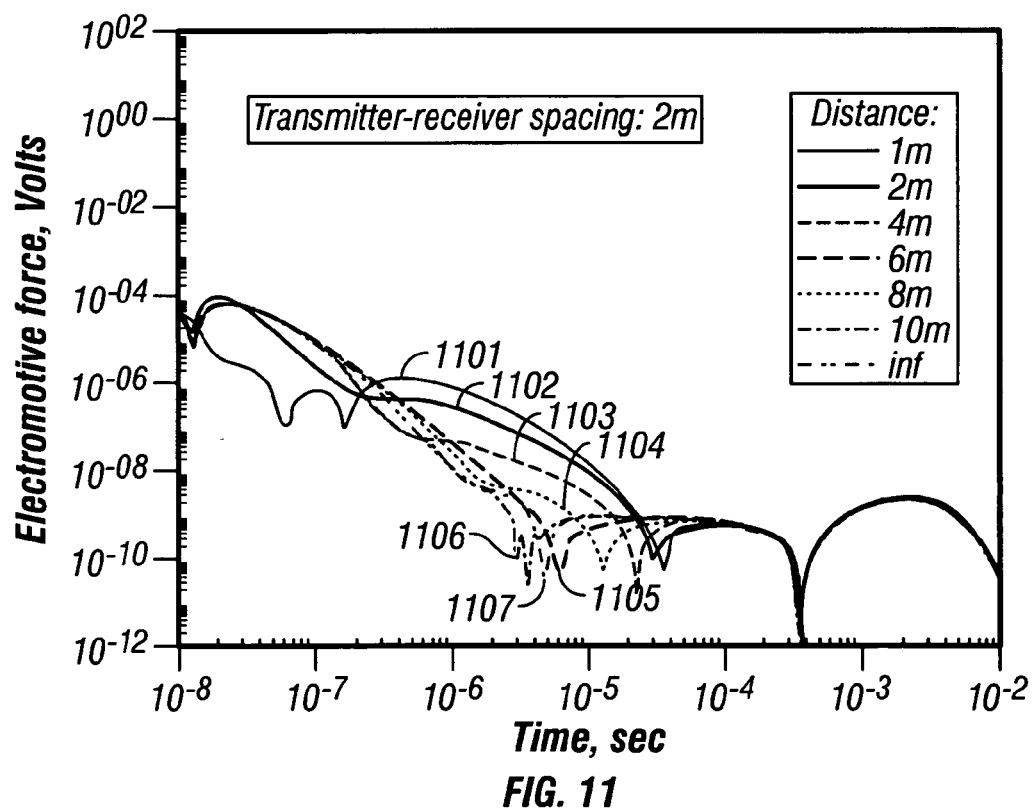
FIG. 11 shows the results of differential processing of the data of FIG. 9.

Alternatively, Eq. (18) enables the construction of several localized filters for eliminating the pipe influence. Typically, these filters comprise small sliding windows. Filtering can be performed using differentiation or integration methods. The following filter of Eq. (25) eliminates the main term $b_0$, of the pipe contribution:

$$H_z^{dif} = \frac{\partial (t^{1/2} H_z)}{\partial t} \tag{25}$$

where $H_z$ is the measured response. FIG. 11 shows the results of differential processing of the curves of FIG. 9. For time durations less than $10^{-4}$ seconds, response curves can be distinguished from each other. Curves 1101, 1102, 1103, 1104, 1105 and 1106 represent responses to a remote boundary at a distance of 1, 2, 4, 6, 8, and 10 meters. Curve 1107 represents a response to a remote boundary at an infinite distance. Comparison with FIG. 9 indicated an improved resolution.

In order to filter using integration, it is practical to consider two times, $t_1$ and $t_2$. An average of the measured field with a weight of $t^{1/2}$ can be made over two time intervals, both having a duration $\Delta$. The first and the second intervals are centered at the points, $t_1$ and $t_2$, respectively. Integrating over the time interval, one obtains:

$$I_1 = \frac{1}{\Delta}\int_{-\Delta/2}^{\Delta/2} t^{1/2} H_z(t-t_1) dt \approx \frac{1}{\Delta}\int_{-\Delta/2}^{\Delta/2} t^{1/2} H_z^0(t-t_1) dt + \frac{b_0}{\sqrt{\pi\mu\sigma_c}} \tag{26}$$

$$I_2 = \frac{1}{\Delta}\int_{-\Delta/2}^{\Delta/2} t^{1/2} H_z(t-t_2) dt \approx \frac{1}{\Delta}\int_{-\Delta/2}^{\Delta/2} t^{1/2} H_z^0(t-t_2) dt + \frac{b_0}{\sqrt{\pi\mu\sigma_c}} \tag{27}$$

The difference of Eq. (26) and (27) produces an integration filter Eq. (28) that eliminates the influence of the pipe:

$$I_1 - I_2 \approx \frac{1}{\Delta}\int_{-\Delta/2}^{\Delta/2} t^{1/2} [H_z^0(t-t_1) - H_z^0(t-t_2)] dt \tag{28}$$

Figure 12:
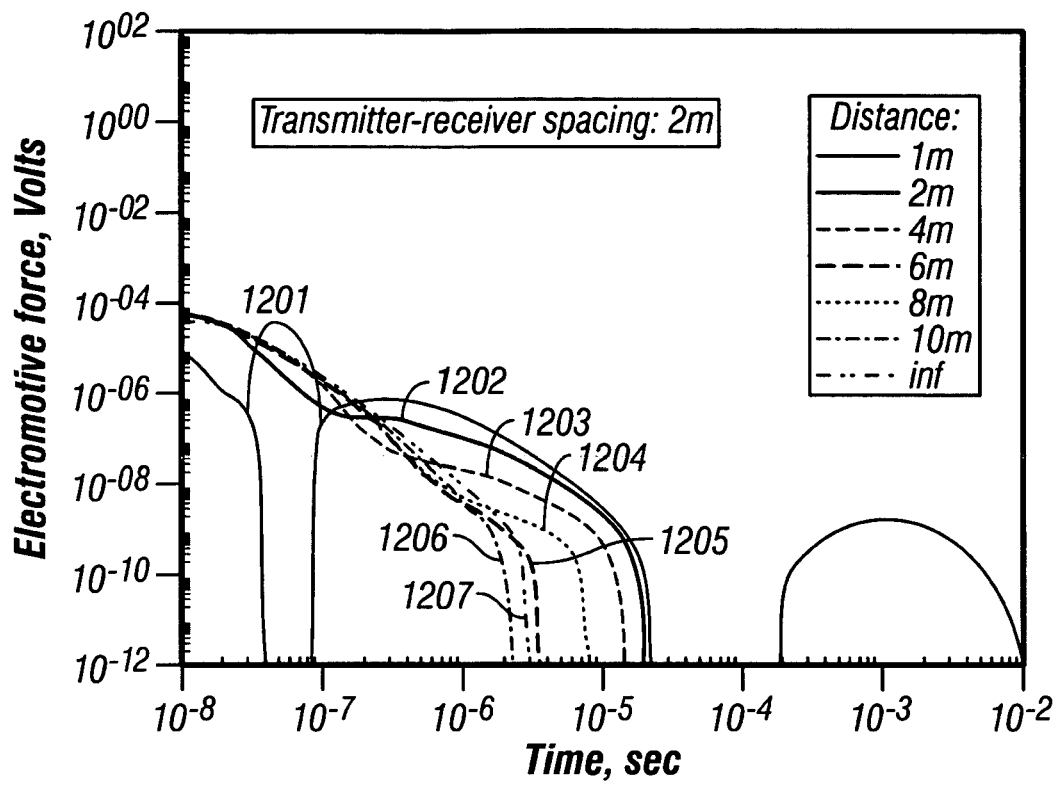
FIG. 12 shows the results of integral processing of the data of FIG. 9.

FIG. 12 shows the results of integral processing of the data of FIG. 9. Pipe conductivity is $1.4*10^6$ S/m. Curves 1201, 1202, 1203, 1204, 1205 and 1206 represent responses to a remote boundary at a distance of 1, 2, 4, 6, 8, and 10 meters. Curve 1207 represents a response to a remote boundary at an infinite distance. Both differential and integration processing result in a resolution improvement. Processing via integration is typically more stable.

Figure 13A:
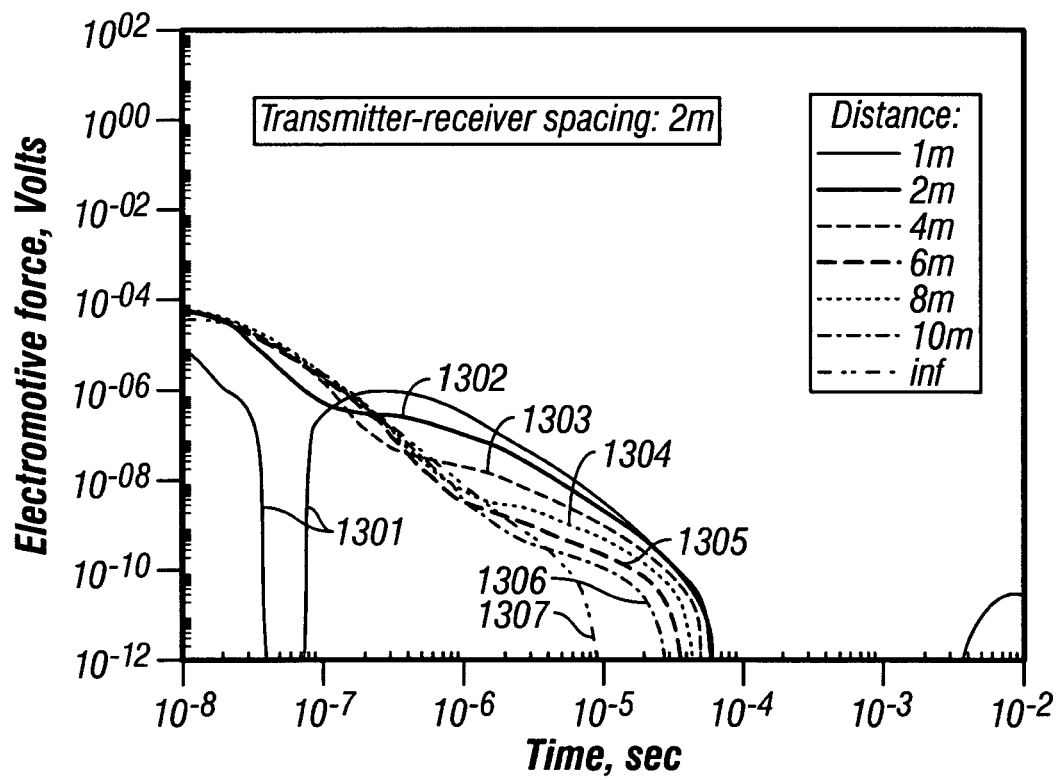
FIGS. 13A and 13B show the results of integral processing for pipes of varying conductivities.
Figure 13B:
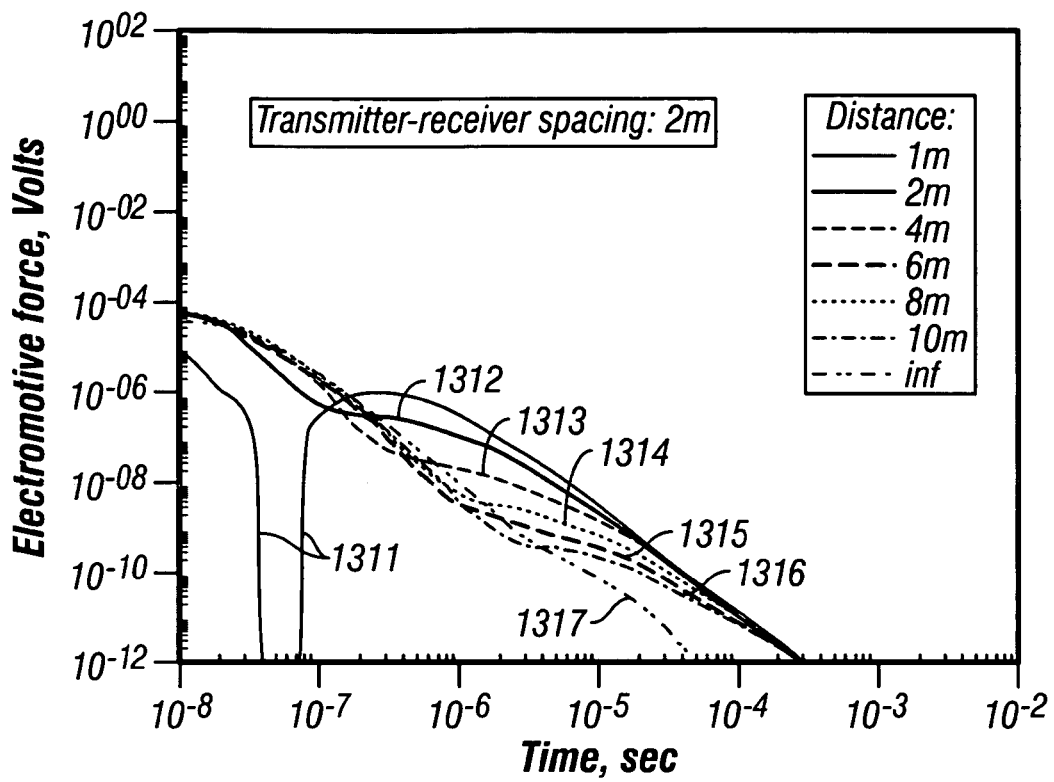

FIGS. 13A and 13B show the results of integral processing for more conductive pipes. FIG. 13A shows a pipe conductivity equal to $3*10^7$ S/m. Curves 1301, 1302, 1303, 1304, 1305 and 1306 represent responses to a remote boundary at a distance of 1, 2, 4, 6, 8, and 10 meters. Curve 1307 represents a response to a remote boundary at an infinite distance. FIG. 13B shows a pipe conductivity equal to $1.4*10^{10}$ S/m. Curves 1311, 1312, 1313, 1314, 1315 and 1316 represent responses to a remote boundary at a distance of 1, 2, 4, 6, 8, and 10 meters. Curve 1317 represents a response to a remote boundary at an infinite distance. The filtered signal does not depend on the pipe conductivity at earlier times. At later times, the pipe makes a dominant contribution to the measured signal, and this is reflected in the loss of resolution.

Figure 13C:
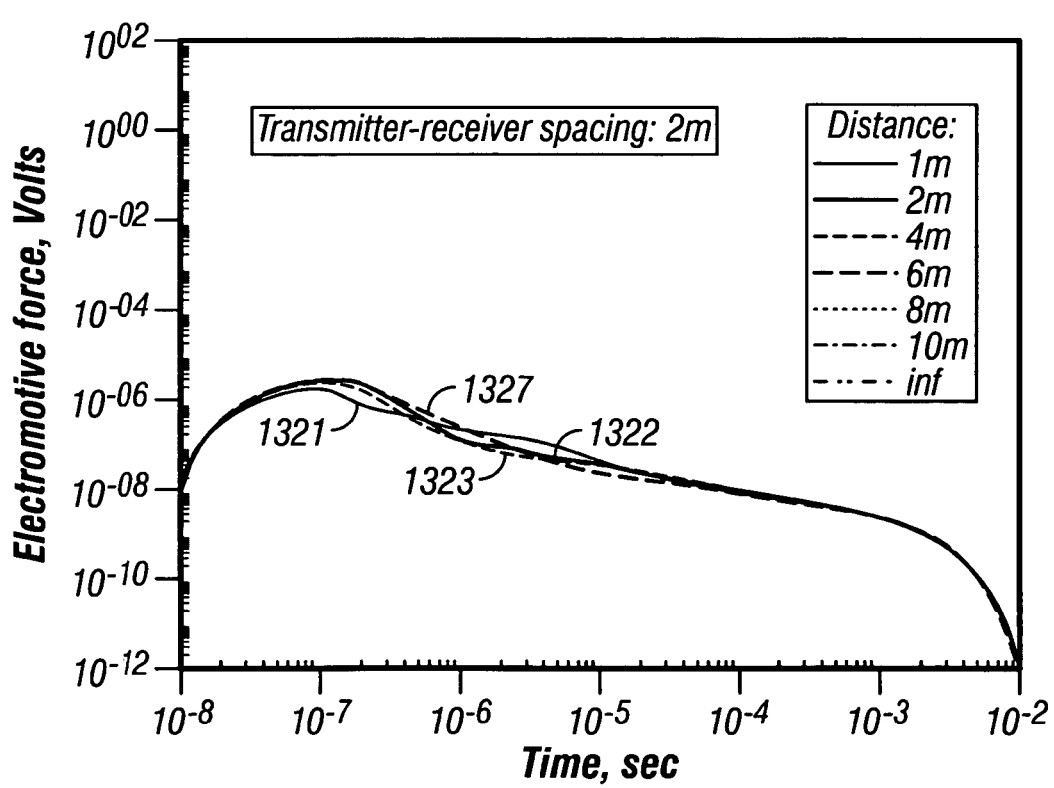
FIG. 13C shows the transient responses in a conductive benchmark.

FIG. 13C shows the response for 2-meter spacing of a more conductive formation. Curves 1321, 1322, and 1323 represent responses to a remote boundary at a distance of 1, 2, and 4 meters. Response curve 1327 represents the response to a remote boundary at an infinite distance. Response curves at distances of 6 m, 8 m, and 10 m are indistinguishable from curve 1327. These response curves are nearly indistinguishable from each other. Results shown in the figure ensure that, on the low resistivity end, the response retains the necessary sensitivity. The formation resistivity is changed to 10 Ohm-m and the shale/water resistivity to 1 Ohm-m. Comparing FIG. 13C to FIG. 9, one can observe the skin-effect in FIG. 13C at very early times (i.e. $10^{-8}$ sec) and the shift of maximum sensitivity (~$3*10^{-7}$ sec in FIG. 9) to later times (~$10^{-6}$ sec in FIG. 13C). Both facts can be explained due to an increase of the formation conductivity.

Figure 13D:
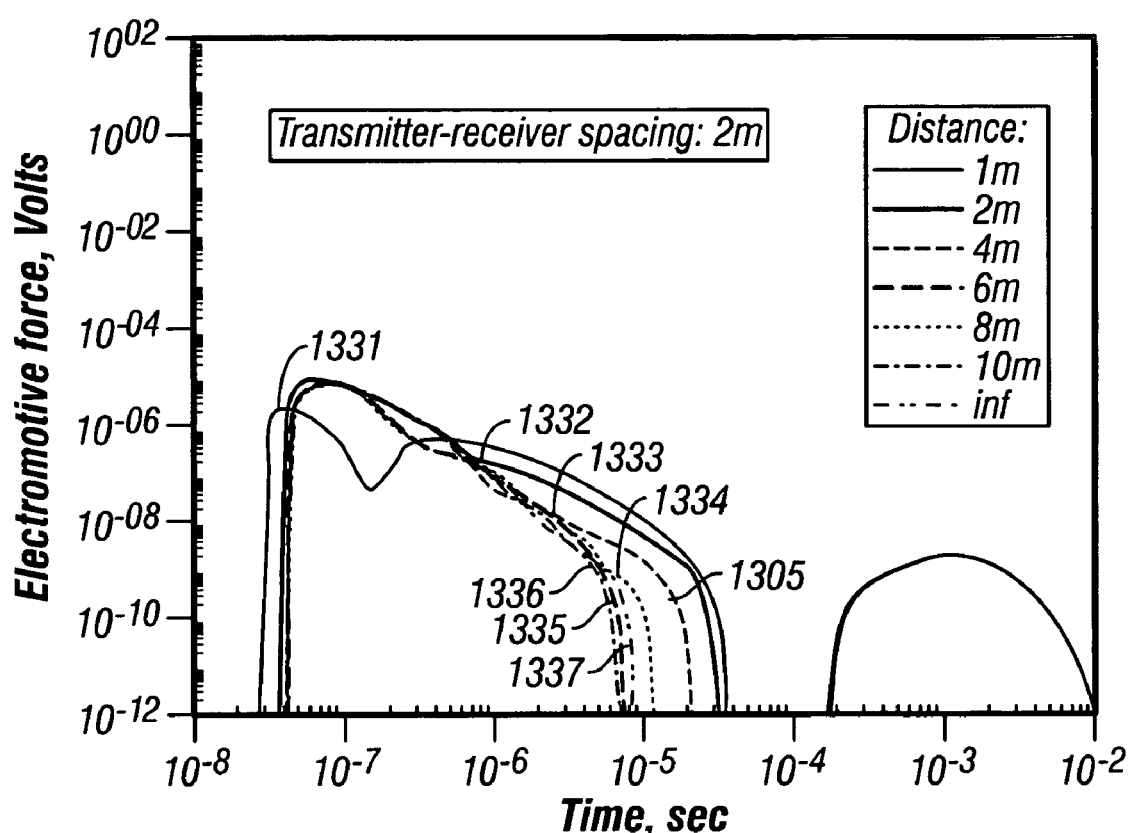
FIG. 13D shows the results of the integral processing of the responses shown in FIG. 13C.

In FIG. 13D, results of the integral processing are presented. Curves 1331, 1332, 1333, 1334, 1335 and 1336 represent responses to a remote boundary at a distance of 1, 2, 4, 6, 8, and 10 meters. Curve 1337 represents a response to a remote boundary at an infinite distance. Comparison of FIG. 13D with FIG. 12 shows a time period of maximum sensitivity of the processed data being shifted to later times. (See, for example, curves 1201 through 1204 in FIG. 12 and curves 1331 through 1334 in FIG. 13D) This maximum sensitivity has the same order of magnitude as the sensitivity of the processed data in the resistive benchmark.

The invention has been described above with reference to a MWD apparatus carried on a drillstring. The method of the invention can also be used on other types of MWD apparatus conveyed on a drilling tubular, and may also be used on a logging tool carried on a wireline. The last such method is of relatively minor importance since on wireline devices, it is possible to have a housing of very high conductivity so that the correction methods described herein may not be necessary. Such means of conveyance would be known to those versed in the art and are not discussed further.

While the foregoing disclosure is directed to the preferred embodiments of the invention, various modifications will be apparent to those skilled in the art. It is intended that all such variations within the scope and spirit of the appended claims be embraced by the foregoing disclosure.

Appendix: Taylor's Frequency Series for MWD Electromagnetic Tool

We intend to evaluate the asymptotic behavior of magnetic field on the surface of a metal mandrel as described in Eq. (6):

$$H_\alpha(P) = H_\alpha^0(P) + \beta \int_S \{\vec{H}^{M\alpha}\vec{h}\} dS \quad (A3.1)$$

where $H_\alpha(P)$ is the magnetic field measure along the direction $\alpha$ ($\alpha$-component), P is the point of measurement, $H_\alpha^0(P)$ is the $\alpha$-component of the measured magnetic field given a perfectly conducting mandrel, S is the surface of the tool mandrel, $\beta = 1/\sqrt{-i\omega\mu\sigma_c}$, where $\omega$ and $\mu$ are frequency and magnetic permeability, and $^{m\alpha}h$ is the magnetic field of an auxiliary magnetic dipole in a formation where the mandrel of a finite conductivity is replaced by an identical body with a perfect conductivity. The dipole is oriented along $\alpha$-direction. At high conductivity, $\beta$ is small. The primary and auxiliary magnetic fields, $H_\alpha^0$ and $^{M\alpha}\vec{h}$, depend only on formation parameters. The total magnetic filed, $H_\alpha$, depends on both formation parameters and mandrel conductivity. The dependence on mandrel conductivity, $\sigma_c$, is reflected only in parameter $\beta$:

$$\beta = \frac{1}{k_c} = \frac{1}{\sqrt{-i\omega\mu\sigma_c}} \quad (A3.2)$$

The perturbation method applied to Eq.(A3.1) leads to the following result:

$$H_\alpha = \sum_{i=0}^{i=\infty} {}^{(i)}H_\alpha \quad (A3.3)$$

$${}^{(0)}H_\alpha = H_\alpha^0 \quad (A3.4)$$

$${}^{(i)}H_\alpha = \beta \int_S \{{}^{(i-1)}\vec{H}^{M\alpha}\vec{h}\} dS \quad (A3.5)$$

$$i = 1, \ldots, \infty$$

Let us consider the first order approximation that is proportional to the parameter $\beta$:

$${}^{(1)}H_\alpha = \beta \int_S \{{}^{(0)}\vec{H}^{M\alpha}\vec{h}\} dS = \beta \int_S \{\vec{H}_0^{M\alpha}\vec{h}\} dS \quad (A3.6)$$

The integrand in Eq. (A3.6) does not depend on mandrel conductivity. Therefore, the integral in right-hand side, Eq. (A3.6), may be expanded in wireline-like Taylor series with respect to the frequency:

$$\int_S \{\vec{H}_0^{M\alpha}\vec{h}\} dS \approx b_0 + (-i\omega\mu)b_1 + (-i\omega\mu)^{3/2}b_{3/2} + (-i\omega\mu)^2 b_2 + \ldots \quad (A3.7)$$

In axially symmetric models, coefficients $b_j$ have the following properties:
- $b_0$ does not depend on formation parameters. It is related to so called 'direct field';
- $b_1$ is linear with respect to formation conductivity. It is related to Doll's approximation;
- $b_{3/2}$ depends only on background conductivity and does not depend on near borehole parameters;
- $b_2$ includes dependence on borehole and invasion.

Let us substitute Eq.(A3.7) into Eq.(A3.6):

$${}^{(1)}H_\alpha = \frac{1}{\sqrt{\sigma_c}} \left( \frac{b_0}{(-i\omega\mu)^{1/2}} + (-i\omega\mu)^{1/2}b_1 + (-i\omega\mu)b_{3/2} + (-i\omega\mu)^{3/2}b_2 + \ldots \right) \quad (A3.8)$$

Eq.(A3.3), (A3.4), and (A3.8) yield:

$$H_\alpha \approx H_\alpha^0 + \frac{1}{\sqrt{\sigma_c}} \left( \frac{b_0}{(-i\omega\mu)^{1/2}} + (-i\omega\mu)^{1/2}b_1 + (-i\omega\mu)b_{3/2} + (-i\omega\mu)^{3/2}b_2 + \ldots \right) \quad (A3.9)$$

Collecting traditionally measured in MFF terms $\sim\omega^{3/2}$, we obtain:

$$(-i\omega\mu)^{3/2}(H_\alpha)_{3/2} \approx (-i\omega\mu)^{3/2}(H_\alpha^0)_{3/2} + \frac{(-i\omega\mu)^{3/2}b_2}{\sqrt{\sigma_c}} \quad (A3.10)$$

The first term in the right hand side, Eq.(A3.10), depends only on background formation. The presence of imperfectly conducting mandrel makes the MFF measurement dependent also on a near borehole zone parameters (second term, coefficient $b_2$) and mandrel conductivity, $\sigma_c$. This dependence, obviously, disappears for a perfect conductor ($\sigma_c \to \infty$). We should expect a small contribution from the second term since conductivity $\sigma_c$ is very large.

To measure the term $\sim\omega^{3/2}$, we can modify MFF transformation in such a way that contributions proportional to $1/(-i\omega\mu)^{1/2}$ and $(-i\omega\mu)^{1/2}$, Eq. (A3.9), are cancelled. We also can achieve the goal by compensating the term $\sim 1/(-i\omega\mu)^{1/2}$ in the air and applying MFF to the residual signal. The latter approach is preferable because it improves the MFF stability (less number of terms needs to be compensated). Let us consider a combination of compensation in the air and MFF in more detail. It follows from Eq. (A3.9) that the response in the air, $H_\alpha(\sigma=0)$, may be expressed in the following form:

$$H_\alpha(\sigma=0) \approx H_\alpha^0(\sigma=0) + \frac{1}{\sqrt{\sigma_c}}\left(\frac{b_0}{(-i\omega\mu)^{1/2}}\right) \qquad (A3.11)$$

Compensation of the term ~$b_0$, Eq.(A3.11), is critical. Physically, this term is due to strong currents on the conductor surface and its contribution (not relating to formation parameters) may be very significant. Equations (A3.9) and (A3.11) yield the following compensation scheme:

$$H_\alpha - H_\alpha(\sigma=0) \approx (-i\omega\mu)(H_\alpha)_1 + (-i\omega\mu)^{3/2}(H_\alpha)_{3/2} + \qquad (A3.12)$$
$$\frac{1}{\sqrt{\sigma_c}}((-i\omega\mu)^{1/2}b_1 + (-i\omega\mu)b_{3/2} + (-i\omega\mu)^{3/2}b_2 + \ldots)$$

Considering measurement of imaginary component of the magnetic field, we obtain:

$$\text{Im}[H_\alpha - H_\alpha(\sigma=0)] \approx \qquad (A3.13)$$
$$-\left\{\frac{1}{\sqrt{\sigma_c}}\left(\frac{\omega\mu}{\sqrt{2}}\right)^{1/2}b_1 + \omega\mu(H_\alpha)_1 + \left(\frac{\omega\mu}{\sqrt{2}}\right)^{3/2}\left((H_\alpha)_{3/2} + \frac{b_2}{\sqrt{\sigma_c}}\right)\right\}$$

Equation (A3.13) indicates that in MWD applications, two frequency terms must be cancelled as opposed to only one term in wireline. Equation, (A1.4), modified for MWD applications has the following form:

$$\begin{pmatrix} H(\omega_1) \\ H(\omega_2) \\ \vdots \\ H(\omega_{m-1}) \\ H(\omega_m) \end{pmatrix} = \begin{pmatrix} \omega_1^{1/2} & \omega_1^1 & \omega_1^{3/2} & \omega_1^{5/2} & \cdots & \omega_1^{n/2} \\ \omega_2^{1/2} & \omega_2^1 & \omega_2^{3/2} & \omega_2^{5/2} & \cdots & \omega_2^{n/2} \\ \vdots & \vdots & \vdots & \vdots & \cdots & \vdots \\ \omega_{m-1}^{1/2} & \omega_{m-1}^1 & \omega_{m-1}^{3/2} & \omega_{m-1}^{5/2} & \cdots & \omega_{m-1}^{n/2} \\ \omega_m^{1/2} & \omega_m^1 & \omega_m^{3/2} & \omega_m^{5/2} & \cdots & \omega_m^{n/2} \end{pmatrix} \begin{pmatrix} s_{1/2} \\ s_1 \\ s_{3/2} \\ s_{5/2} \\ \vdots \\ s_{n/2} \end{pmatrix} \qquad (A3.14)$$

The residual signal (third term) depends on the mandrel conductivity but the examples considered in the report illustrate that this dependence is negligible due to very large conductivity of the mandrel. Similar approaches may be considered for the voltage measurements.

What is claimed is:

1. A method of obtaining a parameter of interest of an earth formation using a tool conveyed within a borehole in the earth formation, the tool having a body with a finite, non-zero conductivity, said method comprising:
   (a) using a transmitter on the tool for producing a first electromagnetic signal in the earth formation;
   (b) using at least one receiver axially separated from said transmitter on said tool for receiving a second transient signal resulting from interaction of said first signal with the earth formation, said second transient signal dependent upon said conductivity and said parameter of interest; and
   (c) determining from said second signal a third transient signal indicative of said parameter of interest and substantially independent of said conductivity.

2. The method of claim 1, further comprising using said processor for determining from said third signal said parameter of interest.

3. The method of claim 1, wherein said parameter of interest is at least one of (i) a resistivity of said formation, and, (ii) a distance to a bed boundary in said formation.

4. The method of claim 1, wherein a sensitivity of said third transient signal to said earth formation is substantially independent of a spacing between said transmitter and said at least one receiver.

5. The method of claim 4, wherein said spacing between said transmitter and said at least one receiver is approximately 2 meters.

6. The method of claim 1, wherein using said processor in (c) further comprises representing said second signal by a time domain Taylor series expansion.

7. The method of claim 6, wherein said Taylor series expansion is in one half of odd integer powers of time.

8. The method of claim 7, further comprising subtracting from said second signal at least one leading term of the Taylor series expansion.

9. The method of claim 1, wherein using said processor in (c) further comprises applying a filter operation to said second signal.

10. The method of claim 9, wherein said filtering operation further comprises a differential filtering operation.

11. The method of claim 10, wherein said differential filtering operation is of the form $$\frac{\partial (t^{1/2}H_z)}{\partial t}$$

wherein t is time and $H_z$ is a representation of said second signal.

12. The method of claim 9, wherein said filtering operation further comprises an integral filtering operation.

13. The method of claim 9, wherein said integral filtering operation further comprises defining a first and a second specified time.

14. The method of claim 1 wherein said tool is conveyed into the earth formation on one of (i) a drilling tubular, and, (ii) a wireline.

15. A system for determining a parameter of interest of an earth formation having a borehole therein, comprising:
   (a) a tool used within said borehole, said tool having a body with a finite, non-zero conductivity;
   (b) a transmitter which produces a first electromagnetic signal in the earth formation;
   (c) at least one receiver axially separated from said transmitter on said tool which receives a second transient signal resulting from interaction of said first signal with the earth formation, said second transient signal dependent upon said conductivity and said parameter of interest; and
   (d) a processor which determines from said second signal a third transient signal indicative of said parameter of interest, said third transient signal and substantially independent of said conductivity.

16. The system of claim 15, wherein said processor determines from said third signal said parameter of interest.

17. The system of claim 15, wherein said parameter of interest is at least one of (i) a resistivity of said formation, and, (ii) a distance to a bed boundary in said formation.

18. The system of claim 15, wherein a sensitivity of said third transient signal to said earth formation is substantially independent of a spacing between said transmitter and said at least one receiver.

19. The system of claim 18, wherein said spacing between said transmitter and said at least one receiver is approximately 2 meters.

20. The system of claim 15, wherein said processor represents said second signal by a time domain Taylor series expansion.

21. The system of claim 20, wherein said Taylor series expansion is in one half of odd integer powers of time.

22. The system of claim 21, wherein said processor further subtractions from said second signal at least one leading term of said Taylor series expansion.

23. The system of claim 15, wherein said processor further applies a filtering operation to said second signal.

24. The system of claim 23, wherein said filtering operation further comprises a differential filtering operation.

25. The system of claim 24, wherein said differential filtering operation is of the form $$\frac{\partial(t^{1/2}H_z)}{\partial t}$$

wherein t is time and $H_z$ is a representation of said second signal.

26. The system of claim 23, wherein said filtering operation further comprises an integral filtering operation.

27. The system of claim 26, wherein said integral filtering operation further comprises defining a first and a second specified time.

28. The system of claim 15 further comprising a drilling tubular which conveys said tool into the earth formation.

29. The system of claim 15 further comprising a wireline which conveys said tool into the earth formation.

* * * * *